United States Patent [19]

Hewko et al.

[11] Patent Number: 5,087,229

[45] Date of Patent: Feb. 11, 1992

[54] INDEPENDENTLY SUSPENDED STEERABLE MOTOR WHEEL APPARATUS

[75] Inventors: Lubomyr O. Hewko, Clarkston; Balkrishna R. Patel, Troy; Andrew L. Bartos, Clarkston, all of Mich.

[73] Assignee: General Motors Corporation, Detroit, Mich.

[21] Appl. No.: 696,423

[22] Filed: May 6, 1991

[51] Int. Cl.$^5$ .................................................. B60K 1/00
[52] U.S. Cl. .................................. 475/149; 180/65.5
[58] Field of Search .......................... 475/5, 149, 331; 180/65.5, 65.6

[56] References Cited

U.S. PATENT DOCUMENTS

| | | |
|---|---|---|
| 572,036 | 11/1896 | Theryc . |
| 638,643 | 12/1899 | Newman et al. . |
| 834,879 | 11/1906 | Annable . |
| 859,820 | 7/1907 | Knudsen . |
| 1,101,201 | 6/1914 | Linderoth . |
| 1,577,304 | 3/1926 | Schurch . |
| 1,808,748 | 6/1931 | Apple ........................ 475/149 X |
| 1,997,974 | 4/1935 | Moore et al. ................... 172/287 |
| 2,258,328 | 10/1941 | Lee et al. ........................ 180/42 |
| 2,441,801 | 5/1948 | Dever ............................ 172/287 |
| 2,514,460 | 7/1950 | Tucker .......................... 172/287 |
| 2,608,598 | 8/1952 | Hawkins et al. ................ 172/36 |
| 2,899,005 | 8/1959 | Speicher ......................... 180/60 |
| 3,297,926 | 1/1967 | Campbell et al. ............... 318/138 |
| 3,347,333 | 10/1967 | Edwards ..................... 475/149 X |
| 3,477,536 | 11/1969 | Carini ............................ 180/65 |
| 3,812,928 | 5/1974 | Rockwell et al. ............... 180/65 |
| 3,892,300 | 7/1975 | Hapeman et al. ................ 192/2 |
| 3,897,843 | 8/1975 | Hapeman et al. ............... 180/65 |
| 3,937,293 | 2/1976 | Susdorf .......................... 180/65 |
| 4,146,104 | 3/1979 | Leembruggen ................ 180/65 |
| 4,162,713 | 7/1979 | Heitman et al. ............... 180/242 |
| 4,330,045 | 5/1982 | Myers ............................ 180/65 |
| 4,389,586 | 6/1983 | Foster et al. ................... 310/67 |
| 4,402,374 | 9/1983 | Knur et al. ..................... 180/65 |
| 4,799,564 | 1/1989 | Iijima et al. ................ 180/65.6 X |
| 4,918,344 | 3/1990 | Chikamori et al. .......... 475/149 X |
| 5,014,800 | 5/1991 | Kawamoto et al. ............ 180/65.5 |

FOREIGN PATENT DOCUMENTS 3620363 12/1987 Netherlands ................... 180/65.5

Primary Examiner—Leslie A. Braun
Assistant Examiner—Ryan W. Massey
Attorney, Agent, or Firm—Mark A. Navarre

[57] ABSTRACT

A motor wheel apparatus having an integral reduction planetary gearset is steerable and adapted for use in a conventional independently sprung automotive suspension. The motor, gearset and wheel elements are mounted on a single steerable support member to minimize the tolerance stack up and to enable independent servicing of the motor and gearset elements. The output element of the gearset is supported solely by virtue of the gear meshes and a splined connection to the wheel, thereby permitting the output element to self-align with the wheel and isolating the wheel forces from the motor and gearset elements.

6 Claims, 3 Drawing Sheets

INDEPENDENTLY SUSPENDED STEERABLE MOTOR WHEEL APPARATUS

This invention relates to a steerable integral electric motor and wheel assembly for an independent suspension hybrid or electric vehicle.

BACKGROUND OF THE INVENTION

Hybrid or electric vehicles typically include a single electric motor connected to drive a pair of vehicle wheels through conventional powertrain components such as drive shafts, universal joints and differential gearsets. Alternatively, it has been proposed to provide a separate electric motor at each driven wheel, as disclosed for example, in U.S. Pat. No. 3,297,926 to Campbell et al., issued Jan. 10, 1967, and assigned to the assignee of the present invention. In such applications, separate reduction gearsets are provided at each wheel, resulting in a rather large, difficult to package assembly. Furthermore, large and heavy wheel assemblies can adversely affect the ride, handling and performance of the vehicle.

SUMMARY OF THE PRESENT INVENTION

The present invention is directed to an improved motor wheel apparatus having an integral reduction planetary gearset, the apparatus being steerable and adapted for use in a conventional independently sprung automotive suspension. The motor, gearset and wheel elements are mounted on a single steerable support member which is pivotably mounted about vertical and horizontal axes, minimizing the tolerance stack up and enabling independent servicing of the motor and gearset elements. The output element of the gearset is supported solely by virtue of the gear meshes and a splined connection to the wheel hub, thereby permitting the output element to self-align with the wheel and isolating the wheel forces from the motor and gearset elements. Numerous other novel features cooperate to provide a particularly efficient and compact assembly.

DETAILED DESCRIPTION OF THE INVENTION

Figure 1:
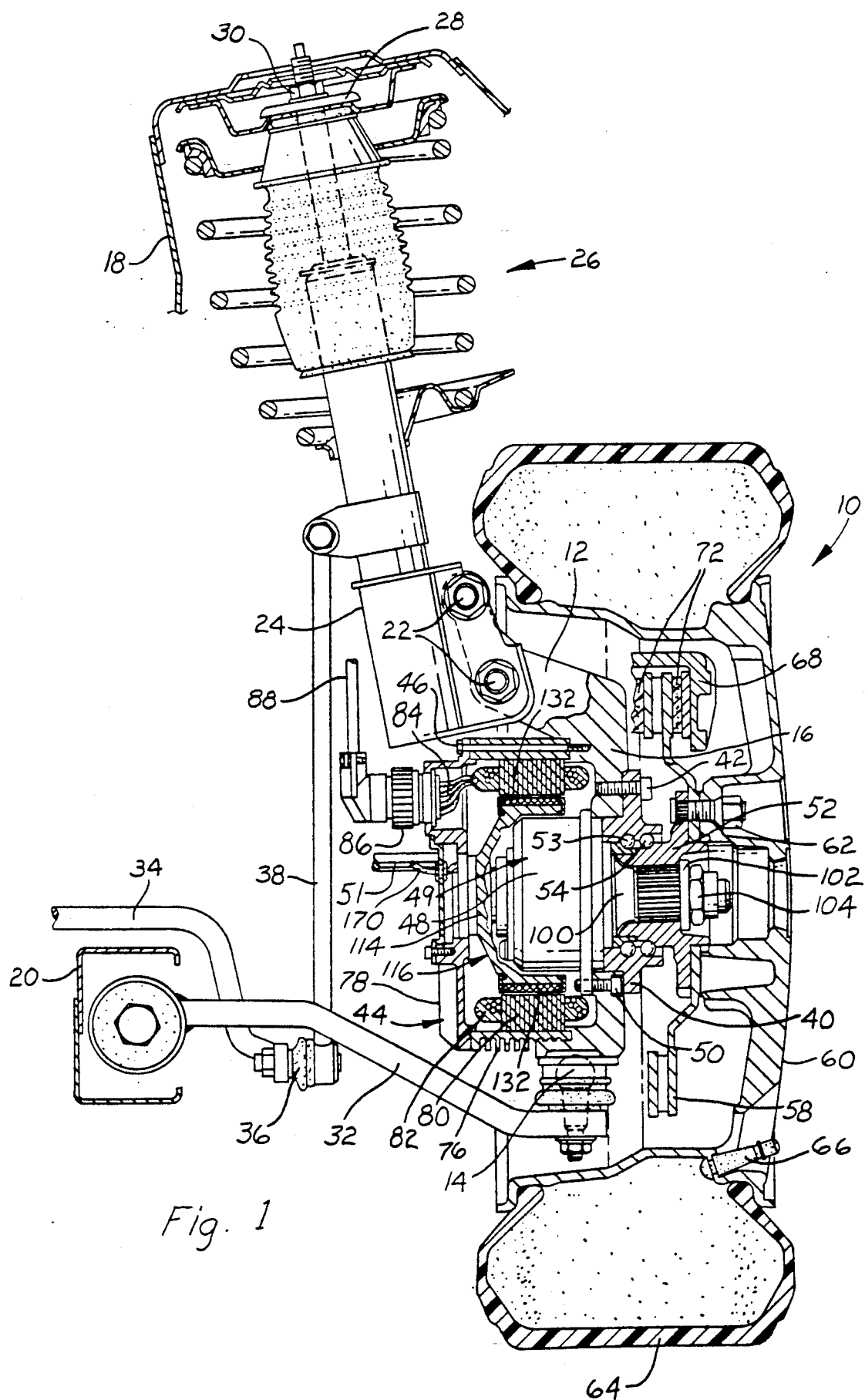
FIG. 1 is a partially sectioned view of the motor wheel of this invention installed in a vehicle.

Referring particularly to FIG. 1, the reference numeral 10 generally designates the motor wheel of this invention as installed in a motor vehicle. A steering knuckle 12 and ball joint 14 form the upper and lower ends of the motor wheel support element 16 and attach the motor wheel 10 to the vehicle shock tower 18 and frame member 20, respectively. The steering knuckle 12 is attached via bolts 22 to a mounting clamp 24 secured to a lower end of a conventional McPherson strut assembly 26. The upper end of the strut assembly 26 is secured within the vehicle shock tower 18 in a conventional manner by the end plate 28 and nut 30. The end plate 28 rides on a ball bearing (not shown) which permits rotation of the strut assembly about its longitudinal (vertical) axis 26 when the motor wheel 10 is steered. A lower control arm 32 couples the ball joint 14 to the frame member 20, defining a horizontal axis about which the support member 16 may rotate. A sway bar 34 referenced to a frame member (not shown) of the vehicle is coupled to the strut assembly 26 via ball joint 36 and sway bar link 38.

Figure 2:
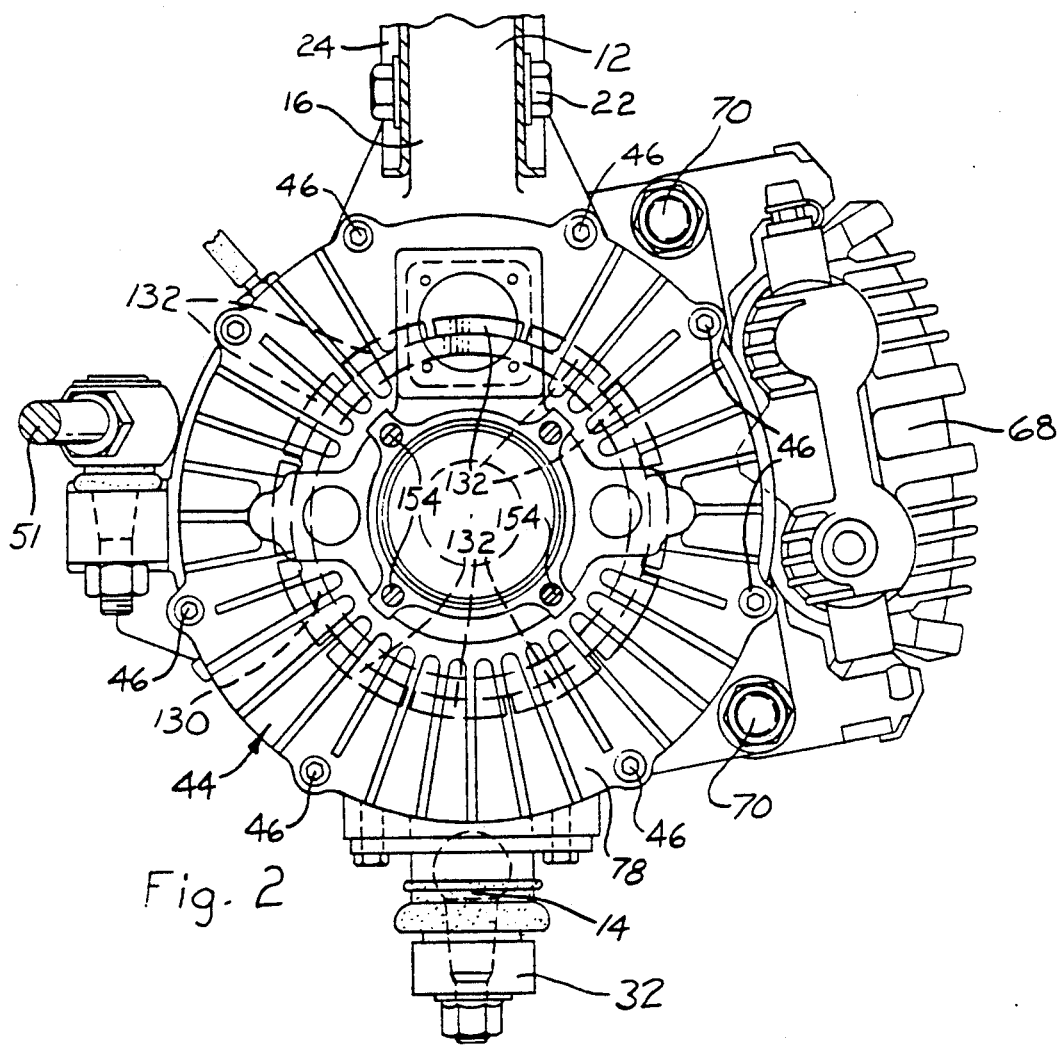
FIG. 2 is an elevational end view of the motor wheel of FIG. 1.

The various elements of motor wheel 10 are all connected, directly or indirectly, to the support element 16. An outer wheel bearing element 40 is attached to support element 16 via bolts 42; a motor housing 44 is attached to the support element 16 via bolts 46; and the housing 48 of a planetary reduction gearset assembly (generally designated by the reference numeral 49) is attached to the support element 16 via bolts 50. A steering tie rod 51 (if the wheel is intended to be steerable) or toe link (if the wheel is not intended to be steerable) attaches to a flange of the support element 16, as best viewed in FIG. 2.

Figure 3:
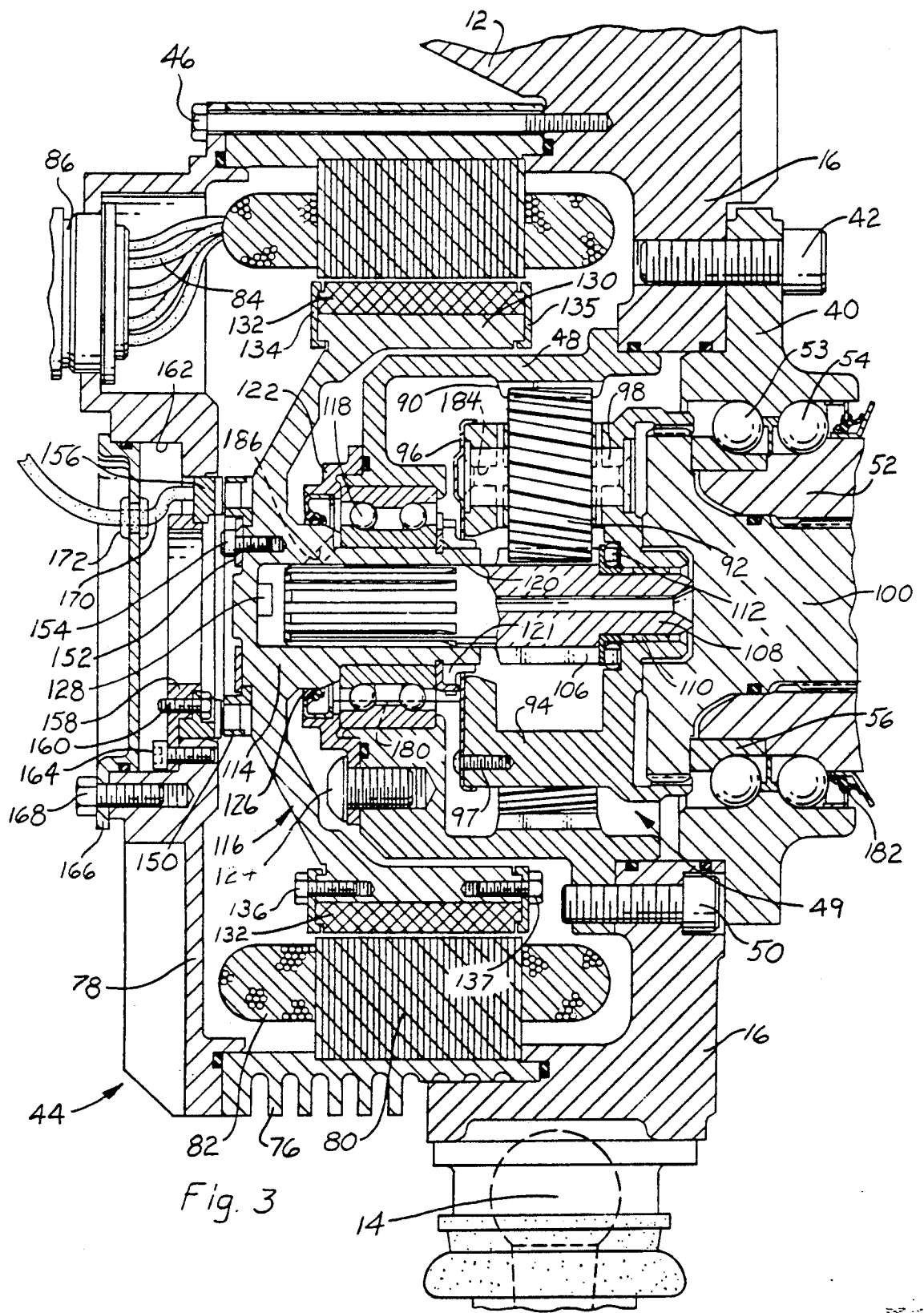
FIG. 3 is an enlarged partial sectional view of the motor and gearset of the assembly depicted in FIG. 1.

Referring particularly to FIG. 3, an inner wheel bearing element 52 is rotatably supported within the outer wheel bearing element 40 on a pair of ball bearings 53 and 54. A disk brake rotor 58 and wheel rim 60 are secured to the inner wheel bearing 52 via lug nuts 62, the wheel rim 60 supporting a conventional tubeless tire 64 and fill valve 66. A brake caliper 68 (best seen in FIG. 2) is secured to the housing element 16 via bolts 70, and houses a pair of brake pads 72 which form a friction brake with the rotor 58.

The motor housing 44 comprises a finned cylindrical section 76 and a finned end cover 78. The section 76 internally supports a twelve-pole laminated stator core 80 and three-phase stator winding 82. The winding lead-in conductors 84 pass through a connector 86 captured in the end cover 78, and are routed to a central control unit (not shown) via cable 88.

The housing element 48 of planetary gearset 49 has a set of internal helical gear teeth 90 which define the ring of the gearset. Within the ring are supported a set of four helical planet gears 92 and a planet carrier 94. An oil diverter plate 96 fastened to the carrier 94 via screws 97 channels lubrication oil into the hollow pinion pin 98 to provide lubrication to the needle bearings (not shown) of the four helical planet gears 92. The outboard end of carrier 94 is loosely splined to a wheel hub 100, which in turn is splined to the inner wheel bearing 52. The wheel hub 100 is located with respect to the inner wheel bearing 52 at the outboard end by the washer 102 and hub nut 104, and at the inboard end by the race 56 of ball bearing 53.

The sun gear teeth 106 of the gearset 49 are formed on a central shaft 108 which is supported at its outboard end within pinion carrier 94 on sleeve bearing 110 and thrust bearing 112. The inboard end of shaft 108 is splined into the hub 114 of a rotor cup 116. The hub 114, in turn, is supported within the inboard end of housing element 48 on a double row precision ball bearing 118. The bearing 118 is retained at its outboard end by a bearing snap ring and lock nut 120, 121, and at its inboard end by a retainer cap 122. The retainer cap 122 is secured to the housing element 48 by the bolts 124, and supports an oil seal 126 as described below. A stop 128 within rotor hub 114 limits axial displacement of the central shaft 108 in the inboard direction.

The rotor cup 116 includes a cylindrical section 130 partially enveloping the gearset housing element 48, and supporting a plurality of permanent magnets 132 which are magnetically coupled to the poles of stator core 80. The magnets 132 are glued to the outer periphery of the section 130 and are mechanically retained by spring clips 134, 135, which in turn are secured to the section 130 by bolts 136, 137. Since both the stator core 80 and the rotor cup 116 are referenced to the support element 16, the tolerance stack up is minimized, allowing a very small nominal working air gap therebetween.

A stationary sensor assembly secured within the end cover 78 cooperates with a rotary sensor ring 150 secured to the outboard end of rotor hub 114 via washer ring 152 and bolts 154. The stationary sensor assembly includes a Hall Effect sensor ring 156 secured to a mounting hub 158 via bolts 160. The mounting hub, in turn, is secured within a recess 162 of end cover 78 via bolts 164. A cap 166 mounted to the end cover 78 via bolts 168 seals the recess 162 from foreign matter. The output conductor bundle 170 of sensor ring 156 passes through a grommet 172 supported in cap 166, and is routed to the central control unit (not shown) with the stator winding cable 88.

In operation, an inverter in the central control unit (not shown) energizes the stator windings 82 with current from a generator or battery pack to produce a rotating magnetic field in the air gap between permanent magnets 132 and the poles of the stator core 80. The electromagnetic field interacts with the magnetic field created by the permanent magnets 132, developing torque for rotating the rotor cup 116. The hub 114 of rotor cup 116, being splined to the shaft 108, rotates the sun gear teeth 106. This rotates the planet gears 92, which react against the stationary ring gear teeth 90, thereby driving the pinion carrier 94 at a reduced speed. In the illustrated embodiment, a reduction ratio of approximately 5:1 is employed. The carrier 94, being splined to the wheel hub 100, which in turn is splined to the inner wheel bearing 52, thereby drives the wheel 60. As indicated above, steerable wheel applications are fundamentally the same as nonsteerable wheel applications.

In order to lubricate the gearset 49, the housing 48 is filled with oil (such as Dextron ATF) substantially to the level indicated by the broken line 180 in FIG. 3. The oil is retained by a number of O-rings and the lip seals 126 and 182. During operation, the diverter plate 96 diverts oil into drilled passages 184 within the pinions 98, and oil is supplied to the double row bearing 118 via drilled passage 186.

As noted above, the output element of the gearset 49—pinion carrier 94—is supported solely by virtue of the gear meshes and the splined connection to wheel hub 100. This "floating" design minimizes the sensitivity to manufacturing tolerances, and permits self-alignment of the carrier 94 with the wheel hub 100. Moreover, this isolates the wheel forces from the motor and gearset elements, increasing load capacity and improving durability.

Due to the fact that the major elements of the motor wheel 10 are all referenced to the support element 16, servicing is greatly enhanced. For example, the motor and gearset elements are independently serviceable, the motor elements by removal of the motor housing sections 76, 78, and the reduction gearset 49 by removal of the outer wheel bearing element 40.

While this invention has been described in reference to the illustrated embodiment, it is expected that various modifications will occur to those skilled in the art. In this regard, it should be appreciated that devices incorporating such modifications may fall within the scope of this invention, which is defined by the appended claims.

The embodiments of the invention in which an exclusive property or privilege is claimed are defined as follows:

1. An integral motor driven wheel apparatus for a motor vehicle comprising:
   a main support element pivotably mounted about a pair of nonparallel axes defined by upper and lower support structures of the vehicle;
   a gearset housing rigidly mounted to said main support element;
   a rotor cup member disposed radially about said housing and supported by said housing for rotation about a longitudinal axis thereof;
   motor means including a stator element rigidly supported on said main support element about said rotor cup member, and a set of permanent magnets secured to said rotor cup member in an area between said rotor cup member and said stator element;
   gearset means disposed within said housing including an input element, a reaction element, an output element, and means for drivingly connecting said rotor cup member to said input element of said gearset means;
   drive means rigidly mounted to said main support element for rotatably supporting a vehicle drive wheel; and
   coupling means for drivingly connecting the output element of said gearset means to said vehicle drive wheel.

2. The apparatus set forth in claim 1, wherein:
   said drive means includes an outer wheel bearing element rigidly secured to said main support element, an inner wheel bearing element rotatably supported within said outer wheel bearing element; and
   said coupling means includes a wheel hub splined at one end to the output element of said gearset means and splined in the other end to said inner wheel bearing element.

3. The apparatus set forth in claim 1, wherein:
   the reaction element of said gearset means is an internal gear formed on an inner peripheral surface of said gearset housing.

4. The apparatus set forth in claim 1, wherein:
   the stator element of said motor means comprises a stator core and winding mounted in a motor housing element which is rigidly secured to said main support element.

5. The apparatus set forth in claim 1, including:
   tie rod means for controlling the pivoting of said main support member about said vertical axis.

6. The apparatus set forth in claim 1, wherein:
   said gearset housing is mounted to an inboard side of said main support element; and
   said drive means is mounted to an outboard side of said main support element opposite said inboard side, whereby said gearset means and said motor means are independently serviceable.

* * * * *